Feb. 21, 1967 P. D. HAM ETAL 3,304,574
FISH SCALING APPARATUS
Filed Jan. 25, 1965
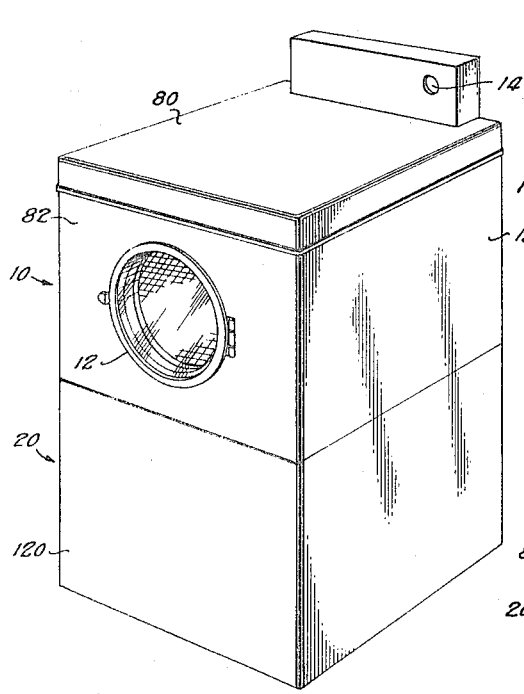
Fig.1
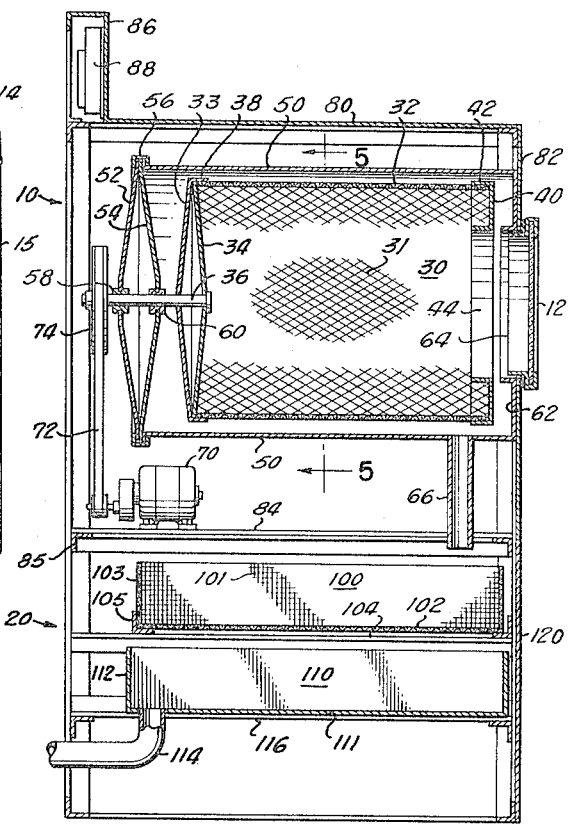
Fig. 2
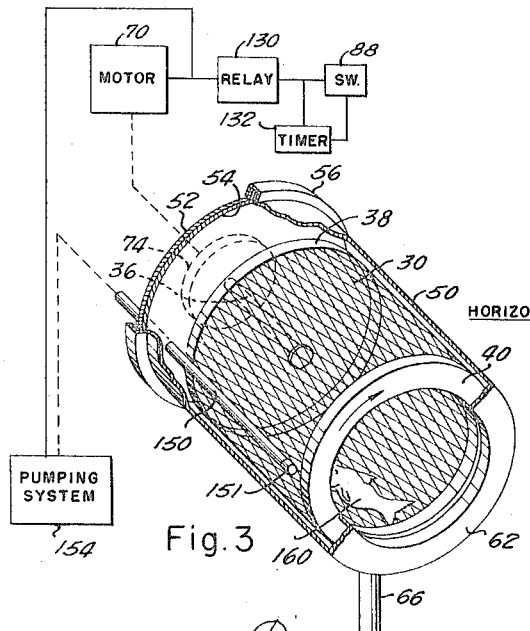
Fig.3
Fig.4
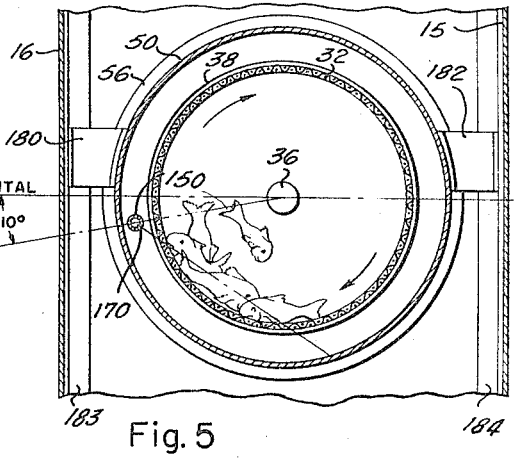
Fig. 5
INVENTORS
Paul D. Ham
Amos J. Timpson
BY Thomas A. Harwood
ATTORNEY United States Patent Office 3,304,574
Patented Feb. 21, 1967

3,304,574
FISH SCALING APPARATUS
Paul D. Ham, Balch Springs, and Amos J. Timpson, Dallas, Tex., assignors to Thomas A. Harwood, Dallas, Tex.
Filed Jan. 25, 1965, Ser. No. 427,872
6 Claims. (Cl. 17—5)

This invention relates to apparatus for scaling fish and more particularly to apparatus for automatically scaling several fish simultaneously by high pressure water jets and adapted for use by the average fisherman.

The broad object of the invention can be stated as the provision of a fish scaling apparatus which is adapted to be used by the average fisherman at some convenient location, such as at a marina on a lake, for example, wherein the operator simply loads a plurality of fish into the machine, actuates the machine by a suitable switch, and the fish are automatically scaled in a very short period of time without further effort being exerted by the operator. Many fish scaling apparatus have been proposed to accomplish this purpose, but have been found to be ineffective because of one or more reasons or have been so troublesome to operate that they have not met with commercial success. For example, some of these previous apparatus have required the operator to individually connect each fish into a clip to be processed through the machine for scaling. This, of course, requires almost as much work by the operators as manually scaling the fish. Other systems have been devised for this purpose but have not been completely effective in scaling the fish on a completely automatic basis. Although the commercial fishing industry has used automatic fish scaling machines for some time, they are in no way adapted to be used or converted to public use for small scale operations.

In accordance with the present invention, a fish scaling apparatus is provided that is quite effective in scaling the fish completely automatically and is adapted for use by the average fisherman, wherein the apparatus can handle many fish at one time, usually an entire catch, and requires only a very short period of time to complete its operation. To accomplish this, the invention employs a container within which the fish are loaded, and high pressure water jets as the means for scaling the fish. Although high pressure water jets have been used previously for scaling fish, a suitable apparatus for automatically positioning the fish in relation to the water stream has not been provided to produce the functions and results noted above. In particular, the container within which the fish are held is a revolvable basket comprised of a suitable screen having holes smaller than the fish themselves but larger than the scales to be removed, so that as the scales fall through the basket and pass out a drain upon removal from the fish. The basket revolves about its axis in a horizontal plane, and a perforated pipe disposed along the length thereof is supplied with a high pressure water source to direct high velocity jets of water against the fish. As the basket revolves, the fish are carried upward along one side thereof until they meet the jets of water, and the water jets knock the fish from the side of the basket causing them to tumble back to the bottom where they are again carried upward into the jets of water. It has been found that the water jets are the means which scale the fish, and a feature of the invention which has been found to provide the most effective and complete scaling action is the position of the perforated water pipe and the direction of the jets of water emitted thereby in relation to the horizontal axis of the revolving basket. Preferably, the perforated pipe is disposed adjacent the outside wall of the basket just below the horizontal diameter thereof and directs the water sprays onto the fish not only at the highest point the fish are carried upward along the side of the basket but also at the bottom of the basket. This allows a maximum amount of water to strike the fish over a maximum time during each cycle of the basket rotation and produces a very effective tumbling action so that the fish will be scaled all over. Because of the very effective scaling action of the machine just described, the average fisherman can simply place several fish in the basket, turn the machine on and all of the scaling is performed automatically in a short period of time.

To adapt the apparatus for use by the average fisherman at suitable locations, such as at a marina on a lake, for example, the revolvable basket is enclosed within a stationary cylindrical drum similar to that used in an automatic washing machine, and the entire assembly is enclosed within a suitable housing. A motor which drives the revolvable basket is connected to a suitable switch and solenoid so that the machine can be coin operated. A pumping system capable of producing a very high pressure is used to supply water to the perforated pipe and is also actuated by the relay and switch. A drain is provided in the bottom of the stationary drum surrounding the revolvable basket to discharge the water and scales removed from the fish which pass through the mesh of the basket. To comply with sanitary requirements, means must be provided for disposing of the fish scales after removal. To provide for this, the scales and water are drained into another screen basket wherein the holes in this basket are smaller than the scales to be removed from the fish. Consequently, the scales are caught and retained in this basket, whereas the water drains on out of the machine.

Other objects, features and advantages of the invention will become readily apparent from the following detailed description of a preferred embodiment thereof when taken in conjunction with the appended claims and the attached drawing wherein like reference numerals refer to like parts throughout the several figures, and in which:

FIGURE 1 is a pictorial view of the fish scaling apparatus as adapted to be used by the general public as are other coin operated machines;

FIGURE 2 is a side elevational view in section of the apparatus showing in detail the revolvable basket which contains the fish during the scaling process;

FIGURE 3 is a fragmentary perspective view of the revolvable basket and enclosing drum shown in FIGURE 2, which also illustrates in block diagram the power and pumping systems of the apparatus;

FIGURE 4 is a fragmentary perspective view showing the perforated pipe used for scaling the fish from the side of the basket; and FIGURE 5 is an elevational view in section taken through section lines 5—5 of FIGURE 2.

Because of the adaptability of the scaling apparatus of the present invention for use by the general public, the preferred embodiment of the invention is constructed for this purpose as shown in the pictorial view of FIGURE 1. The apparatus generally comprises two main sections 10 and 20, wherein the top portion 10 includes the basket for containing the fish during the scaling operation, and the bottom section 20 includes a suitable basket into which the scales are drained after they have been removed. The apparatus very closely resembles a rather tall front end loading automatic washing machine, and as such, includes a front door 12 through which the fish are loaded to be scaled. The door is then shut, a coin is inserted in a slot 14 on the deck 80 of the top section, and the machine operates for a standard length of time to scale the fish. The fish are then removed through the same door through which they were loaded into the machine.

Because of the effectiveness of the scaling apparatus, several pounds of fish can be scaled in only a few minutes. Although the size of the machine can be varied, the machine to be described is capable of scaling at least 25 pounds of fish in from 3 to 5 minutes.

The detailed construction of the apparatus is shown in the side elevational view in section of FIGURE 2, wherein it can be seen that a cylindrical basket 30 disposed with its axis along the horizontal is supported within the machine directly behind the front door 12 thereof. The basket is comprised of a suitable metal screen, such as expanded metal having diamond shaped holes 31, for example, wherein the long axis of the diamonds of the expanded metal are disposed along the horizontal for reasons to be explained hereinafter. Thus a wall 32 of expanded metal forms the basket and is enclosed at one end at the rear of the machine and is open at the front end adjacent door 12. In particular, double walls 33 and 34 of solid metal form the enclosure at the rear end of the expanded metal basket and is attached to the wall 32 thereof about the periphery by welding the basket at the end to a suitable flange 38 forming a part of the double wall. The double wall is used for support purposes to eliminate the necessity of having a single, very thick wall of metal at this end. A rotatable shaft 36 passes through the center of the double wall enclosure along the axis of the revolvable basket 30 and is rigidly attached thereto. At the front end of the basket, a solid annular wall 40 is attached thereto about the periphery along a flange 42 by welding, for example, and defines an opening 44 generally coinciding with door 12. The metal basket is enclosed within a horizontally disposed cylindrical drum 50 concentric with the axis of the basket and spaced therefrom. The cylindrical wall of the drum 50 is comprised of solid metal and is likewise enclosed on one end adjacent the closed end of the basket by means of a double wall structure 52, 54 attached to the wall by means of an annular bracket or clamp 56. This construction is similar to the construction used for the drum in a front end loading washing machine, wherein the drum is rigidly secured within the cabinet of the apparatus so as to be stationary, as will be shown hereinafter. Shaft 36 also passes through the double wall enclosure of the drum through bearings 58 and 60, respectively, so that the shaft is rotatable therein. A suitable motor 70 drives the shaft by means of a pulley belt 72 connected between the motor and over a pulley 74 rigidly attached to shaft 36, so that when the electric motor is actuated, the expanded metal basket will be caused to rotate. The front end of the enclosing drum also includes a solid annular wall 62 defining an opening 64 coinciding with opening 44 of the basket 30 and door 12. An outlet drain 66 is disposed in the bottom front end of the enclosing drum to drain off water and scales of the fish into the lower section of the apparatus.

All the aforedescribed components of the apparatus are enclosed within the top section 10 of the machine, which includes a solid metal top or deck 80, front wall section 82 and side wall sections 15, 16. The motor 70 is mounted on structural member 84 disposed beneath the enclosing drum 50 in spaced relation therefrom as shown, wherein the structural member 84 can comprise a floor or other member suitably mounted to the walls of cabinet by any suitable means, such as by brackets 85. Disposed on the top of the machine is an upright section 86 which includes the combination of a coin slot, timer and switch 88 for actuating the machine, all of which will be described in more detail below.

Disposed beneath structural member 84 within the bottom section 20 of the machine is another screen basket of any suitable shape which has an open top but has a bottom 102 and sides 103. The basket 100 is also comprised of expanded metal or any other suitable mesh having holes 101 and is mounted within the section by any suitable means such as by means of brackets 105 and structural members 104 about the bottom edges of the baskets.

Disposed beneath basket 100 is a drain pan 110 open at its top and enclosed at its bottom 111 and side walls 112. The pan is supported within the cabinet by means similar to that previously described and includes a drain pipe 114 located in the bottom thereof so that water drained into the pan is removed from the apparatus. The bottom of basket 100 is directly exposed to the open top of pan 110 so that water can freely fall through the holes in the basket into the drain pan.

Referring now to the fragmentary perspective view of FIGURE 3, which shows in more detail the rotatable expanded metal basket 30, a perforated pipe 150 closed off at its end 151 passes through the double wall enclosure 52, 54 of drum 50 and is rigidly secured therein. The perforations 170 in the pipe face downward into the expanded metal basket as more clearly shown in the fragmentary perspective view of FIGURE 4. The pipe is preferably disposed just below the horizontal plane passing through the axis of metal basket 30 and runs the length of the basket parallel with the axis thereof. Water is supplied to pipe 150 by a suitable pumping system 154 shown in block diagram, wherein the pumping system can comprise any suitable system for supplying water under pressure to the pipe. Also shown in block diagram is motor 70 which is actuated by a relay 130 when switch 88 is triggered by the placing of a coin in slot 14. A suitable timer 132 is connected to the switch and relay, with the pumping system being connected to the relay, so that the motor and pumping system are actuated to run for a predetermined time sufficient to scale the fish placed within the basket when a coin is inserted in the slot. The pumping system will include a motor and water pump, and the necessary plumbing to provide an intake from a water source and outlet to pipe 150. The pumping system can be installed at any convenient location within the cabinet, such as by mounting it adjacent motor 70, for example.

The operation of the apparatus is as follows: a plurality of fish to be scaled are placed within the basket through door 12, the door is closed, and the apparatus is actuated by the insertion of a coin in slot 14. The basket is caused to rotate in a clockwise direction, viewing it from the front, at a relatively slow speed so that the fish are carried upward toward pipe 150. At the same time, high velocity jets of water are directed from pipe 150 onto the fish, so that as the fish are carried upward in proximity to the pipe, they are knocked from the side of the basket and tumbled to the bottom. It has been found that the high speed jets of water provide the scaling action and also increase the tumbling action of the fish, and that the direction of the jets of water is important to provide a maximum scaling action and to create a maximum amount of tumbling of the fish. As the fish are scaled, the scales are washed from the expanded metal basket and passed through the openings therein, wherein the holes in the basket are large enough to pass any scales to be removed from fish but are smaller than the fish themselves to retain the fish. The water and removed scales flow through the basket and to the bottom of drum 50 where they are passed through outlet 66 into expanded metal basket 100. The openings in basket 100 are smaller than the scales and thus catch them but allow the water to drain directly into drain pan 110.

The orientation of the spray pipe 150 in relation to expanded metal basket 30 and the direction of the jet sprays are seen more clearly in the elevational view in section of FIGURE 5 taken through section lines 5—5 of FIGURE 2. Here it can be seen that the drum 50 is rigidly supported within the cabinet by any suitable means such as by supporting brackets 180, 182 attached to vertical structural members 183, 184, respectively, or directly to the walls 15 and 16 thereof. In order to provide the most effective scaling action, it has been found that the perforations in pipe 150 should be directed toward the bottom of the basket along lines passing through the wall of the basket within an arc thereof defined between 0° and 20° below the horizontal plane that passes through the axis of the basket. A very effective scaling action is achieved wherein the perforations of the spray pipe are directed along lines that intersect the bottom of the basket and pass through the side of the basket at points below the horizontal plane, and in which the points are intersected by radii 10° below the horizontal plane. The directions of the jet streams of water from the pipe perforations as shown in FIGURE 5 depart somewhat from the foregoing description simply because of clarity in showing the jet streams.

The theory of operation is as follows: The expanded metal basket is effective in carrying the fish upward into the jet streams of water until the fish are almost along the horizontal. The fish at this time not only tend to fall to the bottom of the basket but also meet the jet stream of water and are caused to tumble to the bottom thereby. The jet streams of water are the actual scaling mechanism, wherein the rubbing of the fish against the expanded metal basket contributes only a minor portion of the scaling action. When the fish fall to the bottom of the basket, the jet streams of water, because of the direction thereof, also strike the fish at this point, thus causing each fish to be struck with the jet stream of water at at least two locations each trip upward along the side of the basket. Moreover, because of the direction of the water jets, the fish are knocked from the side of the basket just at the instant that the force of gravity tends to cause them to fall away, thus providing a very effective tumbling action and ensuring that all sides of the fish will be reached by the water. The speed of rotation of the basket is fast enough to cause the fish to adhere to the side of the basket because of centrifugal force and the rough quality of the expanded metal, but is slow enough to permit the fish to fall away from the side of the basket as a result of gravity when they are in the proximity of the jet streams.

Although other systems have been provided which use water jets to scale fish, none have been provided which produce the particular combination of functions and actions described herein which have been found to be quite effective in carrying out the objects of the invention, which will be described in more detail below.

The following example will illustrate the effectiveness of the apparatus. An expanded metal basket 30 having a length of about 16 inches and a diameter of about 19.5 inches was used in one instance and was rotated by a ¼ horsepower motor at a speed of about 40 r.p.m. Pipe 150 was disposed at about 10° below the horizontal adjacent the outside of the basket and contained 7 holes equally spaced along the length of the basket, wherein the holes were about .035 inch in diameter. A 3 gallon/minute positive displacement water pumping system was used which would deliver about 600 pounds of pressure absolute at this flow rate. By using the 7 holes in the spray pipe, the pressure is reduced to about 350–400 p.s.i. and the flow rate is increased to about 5 gallons per minute. Under these conditions, the apparatus will completely scale at least 25 pounds of fish in one batch in from 3 to 5 minutes. The effective scaling action of the apparatus is thus very apparent can be contributed to the direction of the water jets in relation to the basket, and the fact that the basket is rotated at the proper speed.

Although the invention has been described with reference to a preferred embodiment thereof, many modifications and substitutions that do not depart from the true scope of the invention will undoubtedly occur to those skilled in the art, and it is intended that the invention be limited only as defined in the appended claims.

What is claimed is:
1. Apparatus for scaling fish comprising:
(a) a cylindrical screen basket for holding fish disposed with the axis thereof substantially horizontal and mounted for rotation about said axis,
(b) the wall of said screen basket defining openings therethrough which are smaller than fish to be scaled but large enough to pass scales removed from said fish,
(c) driving means for rotating said basket about said axis at a speed sufficient, in conjunction with the adherent force of said fish to said basket wall, to carry fish contained therein to substantially a horizontal plane passing through said axis,
(d) a perforated pipe disposed in fixed position exterior to the wall of said basket parallel to said axis, the perforations in said pipe being directed toward the bottom of said basket along lines passing through the wall of said basket within an arc thereof defined between 0° and 20° below said horizontal plane, and
(e) means for supplying water to said pipe under sufficient pressure to produce jet streams of water from said perforations of sufficient strength to remove the scales from the fish and tumble the fish from the wall of said basket and cause them to fall to the bottom of said basket.

2. Apparatus for scaling fish as set forth in claim 1 wherein said basket defines an opening in the front thereof perpendicular to said axis through which fish are loaded and unloaded and is closed at the rear thereof; including a cylindrical drum disposed in fixed, spaced relation about said basket defining a first opening in front thereof generally coinciding with said opening in said basket and defining a second opening in the bottom thereof for draining water and scales passing through said basket, and means communicating with said second opening for retaining scales and passing water.

3. Apparatus for scaling fish as set forth in claim 2 wherein said means communicating with said second opening comprises a second screen basket open at the top to receive water and scales and defining openings therein which are smaller than said scales drained therein.

4. Apparatus for scaling fish as set forth in claim 1 wherein said driving means rotates said basket at about forty revolutions perminute, and the pressure of said jet forty revolutions per minute, and the pressure of said jet from about 350 pounds per square inch to about 400 pounds per square inch.

5. Apparatus for scaling fish as set forth in claim 2 wherein said basket includes an annular wall disposed in the front thereof perpendicular to said axis surrounding said opening to retain said fish therein.

6. Apparatus for scaling fish as set forth in claim 3 including a drain pan open at the top disposed beneath said second screen basket for receiving water passing therethrough.

References Cited by the Examiner

UNITED STATES PATENTS

| Re. 2,515 | 3/1867 | Peaslee | 68—58 |
| 1,210,959 | 1/1917 | Luer | 68—58 X |
| 1,620,953 | 3/1927 | Davis et al. | 17—5 |
| 2,172,470 | 9/1939 | Grow et al. | 17—5 |
| 2,172,471 | 9/1939 | Grow et al. | 17—5 |
| 2,928,118 | 3/1960 | Hairston | 17—5 |
| 2,993,227 | 7/1961 | Couret | 17—3 |

FOREIGN PATENTS 803,935  7/1936  France.

SAMUEL KOREN, *Primary Examiner.*

L. H. LAUDENSLAGER, *Examiner.*